United States Patent [19]

Dambre

[11] Patent Number: 4,651,513
[45] Date of Patent: Mar. 24, 1987

[54] LAYERED STEEL CORD

[75] Inventor: Paul Dambre, Kemmel, Belgium

[73] Assignee: N.V. Bekaert S.A., Zwevegem, Belgium

[21] Appl. No.: 779,568

[22] Filed: Sep. 24, 1985

[30] Foreign Application Priority Data

Sep. 24, 1984 [GB] United Kingdom ................. 8424086

[51] Int. Cl.⁴ .......................... D02G 3/48; D02G 3/12; D07B 1/06

[52] U.S. Cl. ......................................... 57/217; 57/213; 57/215; 57/221; 57/902; 152/451; 152/527; 152/556

[58] Field of Search ................................... 57/212-215, 57/217, 218, 219, 221, 223, 902; 152/451, 527, 556, 557

[56] References Cited

U.S. PATENT DOCUMENTS

| | | |
|---|---|---|
| 2,792,868 | 5/1957 | Benson .............................. 57/902 X |
| 3,015,205 | 1/1962 | Massot et al. ........................ 57/217 |
| 3,240,570 | 3/1966 | Grimes, Jr. et al. ............. 57/217 X |
| 3,413,799 | 12/1968 | Lejeune .................................. 57/217 |
| 3,762,145 | 10/1973 | Kikuchi et al. .................... 57/221 X |
| 3,834,149 | 9/1974 | Nisbet .............................. 57/217 X |
| 3,858,635 | 1/1975 | Nakamoto et al. ............... 57/902 X |
| 4,158,946 | 6/1979 | Bourgois ........................... 57/902 X |
| 4,268,573 | 5/1981 | Baillievier ......................... 57/902 X |
| 4,332,131 | 6/1982 | Palsky et al. ........................... 57/213 |
| 4,349,063 | 9/1982 | Kikuchi et al. .................... 57/215 X |

Primary Examiner—John Petrakes
Attorney, Agent, or Firm—Schwartz, Jeffery, Schwaab, Mack, Blumenthal & Evans

[57] ABSTRACT

A steel cord for reinforcing rubber products such as truck tires comprises a plurality of steel wires twisted together to form a multiwire layered cable construction having two or more successive wire layers around a common core. The wires of the outer layer are covered by a rubber adherable coating of, e.g. brass, and the wires (shaded) of the layer inwardly adjacent the surface layer are covered by a corrosion resistant coating, such as zinc or a zinc alloy.

44 Claims, 7 Drawing Figures

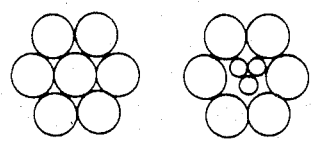
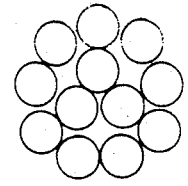
FIG.1
FIG.2
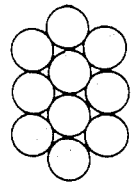
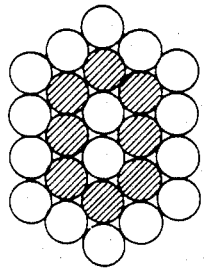
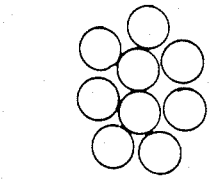
FIG.3
FIG.4

LAYERED STEEL CORD

BACKGROUND OF THE INVENTION

1. Field of the Invention

The present invention relates to steel cords for reinforcing vulcanizable elastomeric materials such as rubber tires, belts and the like. More particularly, it relates to multiwire layered steel cord constructions, especially compact cords of elevated strengthening power, which cords are in addition less prone to erratic filament breakage and to premature cord failures as a result of frequently occurring corrosion and fatigue effects in service. Such improved steel cords can be employed to reinforce a variety of rubber products, but are particularly intended for use as high-duty tire reinforcements and more in particular for obtaining a lasting tire life, e.g. in a truck tire exposed to harsh driving conditions.

2. Background Art

In general, steel cords for use in elastomer systems are prepared by twisting together a plurality of metallic filaments to form cord structures which may widely diverge with respect to construction type, ranging from simple cords ($3 \times 1$, $4 \times 1$, $2+2$, etc.) to more elaborate multi-strand and mixed multiwire/multistrand structures ($7 \times 7$, $1 \times 3 + 5 \times 7 + 1$, $7 \times 4$, etc.). In tire applications filaments are usually high-carbon (0.7–0.8% C) steel wires of diameter 0.1 to 0.4 mm with a tensile strength of about 2500–2700 N/mm$^2$ and all the wires have a rubber adherable surface coating, in most cases a copper-zinc alloy (brass) comprising more than 55% Cu by weight, more generally a thin brass layer of a thickness below 0.50 μm containing from 60 to 75% Cu and 40 to 25% Zn in weight.

Besides the more common cables including several strands, the industry has developed more recently layered cords for tire service. Said cords may be prepared by stranding together a plurality of brassed wires either in one operation or in successive cabling steps to form a desired multilayer cable structure (e.g. a $3+9+15$ construction assembled from 27 wires). By wire layer is meant a twisted assembly of wires in tubular form around a core, which layer has a thickness of substantially one wire diameter.

In cross-section said cords show a more or less closely packed arrangement of wires which form a regular pattern of successive multiwire layers around a core, which core may be comprised of one or more wires or of a central strand. Said consecutively-arranged wire layers may vary in geometrical form (e.g. concentric rings, polygonal arrangement, etc.) and in packing density (compactness) according to cabling method, twisting pitch, core shape and to wire diameters and number of wires per layer.

Such layered cords have certain advantages over the more traditional multistrand cords. There are in fact two main reasons for their introduction: first they occupy less volume for a comparable cord breaking strength (the structure of multistrand cords contains more open space) and secondly, the cord wires are less sensitive to fretting damage because of predominantly linear wire contacts as opposed to the normally present wire cross-overs in multistrand cords.

Although considerable progress has been made in the last 10 years in the art of steel cord making and rubber/steel cord-composite manufacturing and in bonding vulcanized rubber to brass-coated steel wires, there are still major deficiencies in the industry. These include separation of tire rubber from the steel wires after relatively short periods of roadwear (rapid ageing accelerated by corrosion), poor adhesion retention, premature breakage of wires and cords.

Said problems may become even more severe with multilayer cord reinforcements (in particular with compact high-tensile cords) employed in exacting tire environments (heavy driving loads, moisture penetration, heat and humidity ageing, corrosion by moisture and road salts and the like). Under these circumstances premature cord failures and unreliable tire service life are increasingly observed. This underlines the fact that a thin brass layer (usually from 0.10 to 0.40 μm) cannot provide an adequate protection of the steel wire substrate against incidental corrosion attack and hydrogen embrittlement effects. Such an increase in brass layer thickness above 0.40 μm (to afford a better protection) is generally not recommended for reasons of cost and adhesion (especially poor adhesion retention after ageing) cord manufacturers and tire builders have made numerous trials on a lot of cord and coating aspects to develop improvements to solve this persistent problem. Despite all these efforts on adapted cord structures, ternary brass coatings, rubber ingredients and other improvements, the failure problem, especially in the use of compact layered cords, was not satisfactorily solved.

From our improvement efforts and extensive testing, we could separate two important problem areas intimately related to the phenomenon of unsufficient bond and cord durability when applying high-performance compact multilayer cords in exacting tire environments.

A first (general) problem area remains the gradual decrease of the cord/rubber bond stability during normal tire service and further the accelerated adhesion loss due to heat and humidity ageing and to corrosion (moisture + road salts) effects. In this respect we noticed that layered cords, especially the compact versions, are relatively more sensitive to early rubber debonding and separation of rubber plies.

A second problem area is unexpected brittle breakage of wires and premature cord failures. This mainly reflects the fact that most conventional brassed cords have a poor resistance to incidental overstressing and to hydrogen embrittlement and lack sufficient corrosion fatigue endurance. When using high-tensile cords composed of wires with a strength in excess of 2700 N/mm$^2$, (and especially above 3000 N/mm$^2$), the increase in erratic wire breaks may become untolerable. This seriously restricts the fitness for tire use of high-performance steel cords.

This erratic situation is particularly frustrating in the use of more expensive cord constructions of high specific strength (i.e. layered compact cords consisting of an elevated number of wires, in casu high-tensile wires). Furthermore, it may considerably hamper the technical advancement in developing more economical weight-saving high-strength steel cord/rubber composites, such as desired for high-duty truck tires.

Our efforts to provide an improved multilayer cord which does not suffer from the major deficiencies of prior art compact and layered cords were primarily devoted to afford an adequate solution to the premature wire and cord failure problem. Indeed, the teachings of our investigations and in-depth failure analysis revealed that lack of corrosion fatigue endurance and resistance to hydrogen embrittlement of embedded wires and cords may affect tire life and performance in a more radical and catastrophic way than progressive ageing and adhesion degradation. In this respect it has been clearly established that unexpectedly early wire and cord fractures are the dominant deficiency restricting the use of high-strength multilayer cord as a high-duty tire reinforcement in corrosion fatigue conditions. More in particular, it has been surprisingly found that sudden wire breakage occuring preferentially in the subsurface cord layer is the major cause of early cord failure and related shortening of cord/rubber composite life. Thus, the prevention of a localized filament breaking phenomenon appeared to be the key to a novel and effective solution to the frequently observed poor or erratic durability of rubber vulcanizates reinforced with compact layered cords.

OBJECTS AND SUMMARY OF THE INVENTION

Accordingly, the object of our invention is to provide a multiwire layered cord of improved design which does not suffer from the drawbacks as explained above, while still retaining the basic advantages of desired compactness and elevated strength. More in particular, it is our object to provide a novel multilayer cord construction with enhanced corrosion fatigue endurance. A further object is to offer an effective solution to the problem of localized erratic wire breakage leading to early cord failure in cord/rubber composites by shielding the wires of the subsurface cord layer in a more adequate way.

Another object is to provide rubber products, in particular tires, which contain the improved layered cord of this invention, thereby enabling to enhance the service life of said products.

Still another object of the present invention is the provision of a layered cord construction with higher than normal tensile strength permitting the use of high-tensile wire filaments having a strength of more than 2700 $N/mm^2$, and particularly in excess of 3000 $N/mm^2$, with less risk of premature or catastrophic wire and cord failures when employed in high-performance tires exposed to elevated loading stresses, corrosion and humidity ageing.

Yet another object of a specific embodiment of this invention is to provide a compact layered cord with increased durability and better rubber penetration.

According to the invention there is provided a layered steel cord for reinforcing rubber vulcanizates, comprising a plurality of steel wires twisted together to form a cable construction having two or more wire layers consecutively arranged in a regular pattern around a suitable cable core (which contains at least one wire), the wires of the surface layer being covered with a rubber adherable coating such as brass and the wires of the layer inwardly adjacent said surface layer being covered by a corrosion resistant coating, preferably a zinc coating or zinc alloy coating containing at least 50% Zn. Both the outer cord layer and the adjacent subsurface layer have a thickness of essentially one wire diameter, thereby forming successively an outer ring of brassed wires and an inwardly adjacent shielding ring of zinc-coated wires.

The beneficial effects of the novel cord constructions as exemplified by preferred embodiments of the invention are elucidated below.

At least in the preferred embodiments of the invention, the problems of the prior art are solved; namely bond strength and durability are secured, cord corrosion fatigue life is improved and unexpectedly early cracking of cord filaments in preferential places is largely eliminated. These embodiments exhibit a totally new cord construction approach which is simple and surprisingly efficient in practice by providing strong and durably vulcanization bonded rubber composites and by enabling to increase steel cord loading capacity in agressive environments (applicability of elevated strength levels exceeding those of prior art cords).

The novel cord constructions with a specially conceived subsurface wire layer (adjacent to the outermost cord surface layer) provides a more adequate protection against sudden and early wire breaks and against premature onset of cord/rubber degradation by directly shielding the most critical wires (most critical because of too little rubber coverage and absence of sufficient corrosion protection in comparable prior art layered cords, combined with proportionately high cyclic stresses) and probably also indirectly by creating a buffer zone between the rubberized cord surface wire layer and the less stressed cord interior, where emerging moisture (stemming from rubber humidity, more often from external moisture penetrated via rubber ply cuts and travelling up in the free spaces of the cord) may trigger a chain reaction of corrosive attack, hydrogen release and surface charging leading to $H_2$-embrittlement and sudden breakage of the stressed cord wires at preferential locations. This induces accelerated corrosion fatigue failure of the cord (incl. deterioration of adhesion) which ultimately causes a considerable reduction in useful service life of a rubber/cord-composite such as a tire.

A most important additional advantage produced by the cords which are embodiments of the present invention has become apparent: it has been found that, after embedding and vulcanizing the novel cords in various tire compounds, rubber penetration from the cord surface layer to the cord interior is markedly increased in comparison to prior art compact layered cords. This surprising behaviour is very favorable for ensuring stronger cord to rubber bonds. Initial adhesion level is often a problem in applying conventional compact cords because of poor rubber penetration in the closely packed cord structure and may thus necessitate to use a more open configuration of the cord which causes, however, a corresponding loss in strengthening power. With compact layered cord of this invention specific strengthening power can be largely maintained because of a surplus in initial adhesion. Moreover, the observed better rubber penetration also favours the protection degree of the wires in the subsurface cord layer, which factor may contribute to the ascertained significant improvement in cord and cord/rubber composite durability. A possible explanation of this unexpected beneficial effect in compact cords of this invention may rely upon the coincidently favorable transition in rubber adhesion reactivity from the brassed cord surface layer to the zinc coated subsurface wires.

BRIEF DESCRIPTION OF THE DRAWINGS

Some embodiments of the invention will now be described by way of example and with reference to the accompanying drawings, in which:

FIG. 1 shows a 2-layer steel cord in accordance with the invention, having a 1+6+12 construction and (in dotted lines a 3+6+12 construction) in which the wire layers are concentric around a core wire (or core strand of 3 smaller wires). The shaded circles represent the zinc coated wires of the subsurface cord layer.

FIG. 2 shows a cross-sectional view of a 3+9 steel cord of the prior art, and a similar view of a layered 3+9+15 steel cord with two concentric wire rings containing 9 zinc-coated wires according to a preferred embodiment of this invention;

FIG. 3 shows a cross-sectional view of a compact 2+8 cord of the prior art, and a compact 2+8+14 cord in accordance with the invention, with tightly packed wires in a hexagonal pattern;

FIG. 4 shows a cross-sectional view of a more open layered cord 2+7+12 construction in accordance with the invention, derived from a 2+7 cord, forming a rounded polygonal cross-section of approximately oval shape;

DETAILED DESCRIPTION OF THE INVENTION

Figure 5:
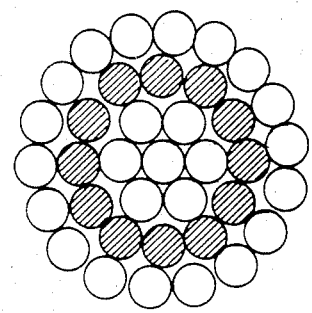
FIG. 5 shows a cross-sectional view of a regular concentric multilayer cord in accordance with the invention, having 3 successive wire layers 6+12+18 construction around a core wire (or 2 successive layers of 12 and 18 wires around a core strand 1+6).
Figure 6:
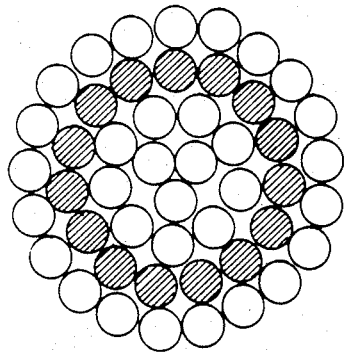
FIG. 6 shows a cross-sectional view of a multilayer cord in accordance with the invention having 3 wire layers and being derived from a 3+9+15 construction with an extra layer of 21 wires.
Figure 7:
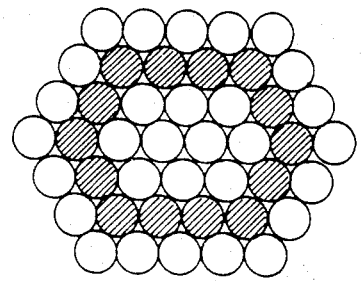
FIG. 7 shows a cross-sectional view of a multilayer cord in accordance with the invention having 3 wire layers and being derived from a 2+8+14 construction with an extra layer of 20 wires to give a 2+8+14+20 construction in a compact arrangement.

The various embodiments of the invention illustrated in the drawings do not restrict the present invention thereto. It generally comprises layered steel cord constructions of improved (corrosion) fatigue endurance wherein the wires are arranged in a more or less compact structure containing a number of N successive wire layers surrounding a core, N being an integer with $N \geq 2$. Herein the external or Nth layer consists of rubber adherent-brass-coated steel wires. The adjacent $(N-1)$th wire layer (ring of shaded wires in the drawings) is entirely composed of steel wires covered with a protective coating other than rubber adherent brass, usually a corrosion resistant metal layer and preferably a coating of zinc or a zinc alloy containing at least 50% Zn. Suitable zinc alloys are for example binary alloy compositions, such as Zn—Ni, Zn—Fe, Zn—Mn and Zn—Al, Zn—Mg, and further binary alloys containing a small addition of a ternary element such as the recently developed hot dip proprietary alloy compositions (polygalva, trigalva, galfan, etc.). Most practical is a simple zinc coating of suitable thickness (preferably at least 0.25 $\mu$m and most preferably not less than 1 $\mu$m) obtainable by electrolytic plating or by hot dip galvanizing.

As already stated above, the compactness of the multilayered cord constructions of this invention can be varied from close density wire stackings to less compact cord structures, though the latter cord types may be less desirable from a volumetric strength efficiency point of view. Cord compactness can be adapted in several ways, for example by a suitable choice of the number of wires in the successive wire layers, or by combining wires of different diameter, or by adapting the cabling and closing operation. In the same way one can modify geometrical regularity (concentricity, shape) of the cord construction.

With respect to the cord manufacturing method, one has the choice between a multistep process and a one-step cabling and closing process.

In a multistep process the two or more wire layers are assembled in one or more separate operations around a pre-existing wire core (or wire strand) or around semi-finished layered cord. This allows to easily adapt stranding lay length and direction between successive wire layers.

In a one-step cabling process the prepositioned wires are simultaneously twisted and closed in the same direction into a multilayer construction, usually a compact cord with fixed wire position.

Particularly preferred embodiments of the present invention are represented by compact cord constructions containing 27 wires. In cross-section they display a concentric layered (3+9+15)-structure which can be assembled in successive machine steps, i.e. first stranding a 3×1 core, followed by twisting 9 wires around it (or also by making first a 12×1 strand of 3+9 structure) and finally applying 15 exterior wires forming the cable jacket. Alternatively the multilayer (3+9+15) construction can be made in one machine run from 27 wires to give a fixed position cord 27×1 with a 3+9+15 wire arrangement. According to the invention, the 9 wires forming a ring between the core and the cord surface layer of 15 brassed wires are covered with a corrosion resistant zinc coating.

By adjusting the cabling parameters it is further possible to make balanced constructions lying in between the strictly fixed position and non-fixed position cord geometry. In this case wire positions within the subsurface layer (comprising e.g. 9 wires in a 27×1 cord) can be altered but remain essentially in this ring layer, which albeit slightly distorted, still forms a quasi continuous shield between cord surface and interior.

The multilayer cords of this invention may also be finished with an external wrapping of a single wire, such as exemplified in the cord structures (3+9+15)+1 obtainable by assembling 27 wires in one or successive machine runs (27×1 or 12×1+15 or 3+9+15, . . . ) followed by a single wire wrapping step.

Other embodiments of inventive cords comprising 27 wires arranged as 2 successive wire layers twisted around a core strand or around a core of wires are for example the cord constructions 4+8+15, 5+8+14 and 4+9+14 wherein the 8 or 9 wires figuring below the outermost brassed wire layer are provided with a zinc coating.

The objects and advantages of the present invention are exemplified below with a layered cord construction comprising 27 wires arranged in a 3+9+15 structure.

EXAMPLE 1

A 2-layer cord was made by twisting together 27 wires of 0.175 mm diameter in three consecutive steps to form a 3+9+15 construction with S/S/Z-cabling direction and a lay length of 5/10/16 mm.

Further data is as follows:
Wire: 0.71% carbon steel wire of tensile strength class of 2700–2850 N/mm$^2$
Average cord strength: 2720 N/mm$^2$
Cord A: all wires brass coated (65% Cu and 35% Zn; thickness 0.18 $\mu$m)
Cord B: second layer of 9 wires provided with hot dip Zn-coating of 2.3 $\mu$m.

Adhesion layer of the cords after vulcanization into rubber strips was determined by means of a pull-out test. This measured the mean tear strength of 3 cords with embedded length of 10 cm, and the results were as follows:

TABLE 1

| Cord type | Bond strength in Newton | | |
|---|---|---|---|
| | Average adhesion level | Max. | Min. |
| Cord A | 263 | 400 | 165 |
| Cord B | 285 | 420 | 185 |

Fatigue and corrosion fatigue tests were also carried out on rubberized cords. For this purpose the vulcanized cords were submitted to cyclic rotary bending at 3000 cycles/minute, respectively in dry conditions and in combined dry and wet conditions. In both cases the fatigue limit was determined by taking the highest stress level at which specimens are not yet broken after 1.2 million cycles. The results were as follows:

TABLE 2

| Cord type | Dry fatigue limit $N/mm^2$ | Fatigue limit after dry and wet cycling* | |
|---|---|---|---|
| | | 100% humidity $N/mm^2$ | 5% NaCl-solution $N/mm^2$ |
| Cord A | 870–890 | 340–420 | less than 300 |
| Cord B | 890–930 | 410–580 | 330–500 |

*In dry and wet cycling the samples are first subjected to 1.2 million dry cycles at 350 $N/mm^2$, then stored for one week in a humidity chamber (100% humidity, respectively 100% humidity + 5% NaCl), and finally subjected to fatigue cycling until the fatigue limit is attained.

As can be taken from the tabulated results, the inventive cord has a considerably better durability than conventional cord in test conditions simulating harsh service circumstances.

EXAMPLE 2

This example illustrates the outstanding rubber reinforcing capacity realizable with high-strength layerd cords according to the present invention.

High-tensile wires of 0.80% carbon steel with a diameter of 0.22 mm and an average tensile strength of 3100 $N/mm^2$ were twisted to a 3+9+15 cord construction.

Cord I: The 9 second layer wires had an electroplated Zn-coating with a thickness of 1.1 μm. The other wires were provided with a rubber adherent brass coating (66.8% Cu and 33.2% Zn; thickness 0.18 μm).

Cord II: Conventional 3+9+15 construction with all 27 filaments brass plated (brass coating as in cord I).

On these cords (vulcanized in rubber) adhesion tests and rotary bending fatigue test in dry and humid conditions were carried out, and the results were as follows:

TABLE 3

| | Summary of the test results | | | | |
|---|---|---|---|---|---|
| | Adhesion results | | Fatigue limit results ($N/mm^2$) | | |
| | Rubber penetration index l/m at 4 bar | Bond strength (Newton) | Dry fatigue | Wet fatigue | |
| | | | | $H_2O$ | 5% NaCl-solution |
| Cord I | 126 | 738 | 925 | 500 | 410–460 |
| Cord II | 90 | 709 | 900–925 | 450 | 260–370 |

From both examples it appears that the cord constructions which are embodiments in accordance with the present invention give a definite improvement in fatigue properties of vulcanized rubber articles, especially in wet and corrosive conditions. It is also to be noted that the standard adhesion level and the dry fatigue limit are slightly better, which is indicative of the already good bond durability in normal conditions. The superior rubber penetration (cfr. table 3) obtained in compact multi-layer steel cords 3+9+15, which are preferred embodiments of the invention, is highly remarkable and may sustain the shielding effect provided by the Zn-coated cord subsurface forming the (N−1)th wire layer.

It is obvious to those skilled in the art that the advantages of the present invention are readily applicable to all equivalents of multiple layer cord consisting of 2 or 3 and more consecutively-arranged wire layers, regardless of manufacturing method, cord geometry and wire composition, provided the wires filling essentially the critical positions adjacent to the external rubberized wires are coated with a corrosion resistant (preferably zinc or a zinc alloy) layer. Thus the invention also extends to multilayer cord with a single wire wrapping, e.g. (3+9+15)+1, multilayer cord stranded in the same direction, multilayer cord with wire layers stranded in the opposite way, multilayer cord with adapted compactness and multilayer cord with varying degrees of fixed wire position.

Finally, although the major part of the described embodiments have been written in terms of regular round wire stackings, it will be recognized by those skilled in the art that there will be numerous other modifications within the scope of the invention as described above, in particular the multilayer combinations of wires and strands, the use of shaped wire (for example flat wires), the change of inner filling degree (more open cords) by omission of some wires in the cord forming wire layers and the like. The invention is readily adaptable to such modifications and is not to be limited to those cord constructions specifically exemplified.

Multilayer cords in accordance with the invention, twisted from steel filaments of normal or greatly increased tensile strength, may be of particular use in the reinforcement of vehicle tyres and particularly the carcasses of truck tyres or in other heavy duty rubber applications requiring weight efficiency, consistent cord properties in severe loading and environmental conditions and long periods of service.

I claim:

1. A rubber adherable multilayer steel cord, comprising:
   a wire core;
   at least two wire layers, each said layer comprising a plurality of steel wires having a tensile strength in excess of 2200 $N/mm^2$, said layers consecutively arranged about said wire core, each of said wire layers having a thickness of about one wire diameter and forming a regular geometric packing having a specific shape and compactness;
   the wires of said outermost layer being covered with a brass coating having a thickness of from about 0.05 mm to about 0.50 mm, said brass coating being rubber adherable and containing copper in an amount of more than about 55% by weight; and
   the wires of said second outermost layer being covered with a corrosion resistant metal coating selected from the group consisting of zinc and a zinc alloy containing at least about 50% by weight zinc.

2. A steel cord as claimed in claim 1, wherein the tensile strength of said steel wire is not less than about 2500 N/mm².

3. A steel cord as claimed in claim 1, wherein said cord is used in reinforcing a pneumatic tire, said steel wire being hard drawn pearlitic steel wire having a diameter of from about 0.1 mm to about 0.4 mm and having from about 0.6% to about 1.2% by weight carbon steel, and a tensile strength in a range of from about 2600 N/mm² to about 3000 N/mm², the wires of said outermost layer being covered by a brass coating having a thickness of from about 0.10 μm to about 0.40 μm, said brass coating having a composition of from about 58% to about 72% Cu, the remainder being substantially zinc.

4. A steel cord as claimed in claim 3, wherein the amount of carbon in said steel wire is from about 0.65% to about 0.90% by weight, and wherein said brass coating has from about 60% to about 70% by weight Cu.

5. A steel cord as claimed in claim 1, wherein said steel wire has a tensile strength of greater than about 3000 N/mm².

6. A steel cord as claimed in claim 1, wherein said cord has a cross-section of nearly circular shape comprising said wire layers twisted together in consecutive steps in either of the same or the opposite direction around said core, and wherein the twisting pitch between said wire layers is adjustable to prevent unwinding and wire migration.

7. A steel cord as claimed in claim 6, wherein said outermost layer is a single wire wrapping.

8. A steel cord as claimed in claim 1, wherein said cord comprises a single twisted bundle of said steel wires, said bundle being closed in a single operation to form a compact fixed position cord with a substantially regular multilayer wire structure, said cord having a cross-section which varies from a circular to a polygonal configuration.

9. A steel cord as claimed in claim 1, wherein the cross-section of said cord exhibits a degree of compactness which is a function of wire diameter, wire shape, the number of wires in each said wire layer, closing operation, and twisting pitch.

10. A steel cord as claimed in claim 1, wherein said zinc alloy is selected from the group consisting of Zn—Ni, Zn—Fe, Zn—Mn, Zn—Al and Zn—Mg.

11. A steel cord as claimed in claim 10, wherein said alloy further contains a ternary element.

12. A steel cord as defined in claim 1, said cord comprises 27 wires twisted together into a layered construction consisting of two wire layers, said core containing one of either 4 or 5 wires, thereby forming a regularly packed cross-section of a type selected from 4+8+15, 4+9+14 and 5+8+14.

13. A steel cord for use in high-duty rubber tires, comprising 27 steel filaments assembled into a compact layered 3+9+15 cord structure having, in cross-section, a 3-filament core surrounded by two concentric steel wire layers comprising an outermost layer of 15 steel wires and a second outermost layer of 9 wires, said layers being formed by one of either a series of consecutive twisting steps or by forming a single twisted bundle of 27 wires in a single machine run, said wires being comprised of hard drawn pearlitic carbon steel wires having from about 0.7% to about 0.9% by weight carbon, a diameter of from about 0.1 to about 0.4 mm, and a tensile strength of at least about 2800 N/mm²;

the wires in said outermost layer being covered with a rubber adherent brass alloy containing from about 60% to about 70% by weight copper; and the wires of said second outermost layer being covered with a corrosion resistant zinc coating, in an amount effective to significantly enhance cord endurance, adhesion retention and related tire life by the combined effect of an increased rubber penetration and of suppressing unexpected local brittle wire breaks, premature cord corrosion and fatigue cracking.

14. A steel cord as claimed in claim 13, wherein said tensile strength of said steel wire is at least about 3000 N/mm².

15. A multistep process for producing a rubber adherable multilayer steel cord, comprising:

assembling at least one corrosion resistant steel wire layer around a steel wire core, said corrosion resistant layer comprising a plurality of steel wires, each said wire being covered with a corrosion resistant metal coating selected from the group consisting of zinc and a zinc alloy containing at least about 50% by weight zinc; and assembling an outermost steel wire layer over said at least one corrosion resistant layer, said outermost layer being covered with a brass coating having a thickness of from about 0.05 μm to about 0.50 μm, said brass coating being rubber adherable and containing copper in an amount of more than about 55% by weight.

16. A process as claimed in claim 15, wherein said process is a multistep process, said at least one corrosion resistant layer and said outermost layer being assembled around either of a pre-existing wire core and a semifinished layered cord.

17. A process as claimed in claim 16, wherein said multistep process includes assembling said wire layers in separate operations.

18. A process as claimed in claim 15, wherein said process is a one step cabling process which includes the steps of:

prepositioning the wires of said wire layers; and simultaneously twisting and closing said prepositioned wires into said multilayer steel cord.

19. A process as claimed in claim 18, wherein said multilayer steel cord is a compact cord with fixed wire positions.

20. A process as claimed in claim 19, wherein said compact cord construction contains 27 wires.

21. A rubber adherable multilayer steel cord having an improved capacity to reinforce vulcanizable rubber products and to withstand premature corrosion fatigue, cracking and cord/rubber debonding in harsh service conditions, said cord comprising a core and a plurality of steel wires with a tensile strength in excess of about 2200 N/mm² twisted together to form a cord construction having N wire layers consecutively arranged around said core with N being an integer of not less than 2, said wire layers having each a thickness of essentially one wire diameter and forming a regular geometrical wire packing of desired shape and compactness, the wires of the cord surface (Nth) layer being covered by a 0.05 to 0.50 μm thick brass coating of a rubber adherable composition containing more than 55% copper, the wires of the (N−1th) layer inwardly adjacent said surface layer being covered by a protective coating.

22. A steel cord as defined in claim 21, wherein said protective coating is a corrosion resistant metal coating comprising zinc.

23. A steel cord as defined in claim 22, wherein said coating comprises a zinc alloy containing at least 50% zinc.

24. A steel cord as defined in claim 22, wherein said wires have a tensile strength exceeding 3000 N/mm$^2$.

25. A steel cord as defined in claim 21, wherein said tensile strength is at least 2500 N/mm$^2$.

26. A steel cord as defined in claim 21, wherein said core is a wire core containing at least one wire.

27. A steel cord as defined in claim 21, wherein said core contains at least one wire strand which may be formed of twisted wires or of substantially parallel wires assembled into a wire strand.

28. A steel cord as defined in claim 21 having a combination of elevated strengthening power and enhanced durability for use in reinforcing a pneumatic tire, said cord being assembled from 0.1 to 0.4 mm diameter hard drawn pearlitic steel wires of 0.6 to 1.2% carbon steel with a tensile strength in a range of from 2600 to 3000 N/mm$^2$, the wires of the cord surface layer being covered by a 0.10 to 0.40 μm thick brass coating of a composition containing from 58 to 72% Cu, the remainder being substantially zinc, and said protective coating covering and the wires of the layer inwardly adjacent said brassed surface layer being a corrosion resistant zinc containing coating.

29. A steel cord as defined in claim 28, wherein said steel wires contain from about 0.65 to about 0.90% carbon.

30. A steel cord as defined in claim 28, wherein said copper content is from about 60 to about 70% copper.

31. A steel cord as defined in claim 30, wherein said brass coating contains a ternary alloying element.

32. A steel cord as defined in claim 31, wherein said ternary alloying element is cobalt.

33. A steel cord as defined in claim 31, wherein said ternary alloying element is nickel.

34. A steel cord as defined in claim 21 having a cross-section of nearly circular shape comprising successive substantially concentric wire layers twisted together in consecutive steps, in the same direction around said core, and wherein the twisting pitch between the successive layers is adjustable to prevent unwinding and/or wire migration.

35. A steel cord as defined in claim 34, wherein said cord is finished with an external single wire wrapping.

36. A steel cord as defined in claim 21 having a cross-section of nearly circular shape comprising successive substantially concentric wire layers twisted together in consecutive steps, in the opposite direction around said core, and wherein the twisting pitch between the successive layers is adjustable to prevent unwinding and/or wire migration.

37. A steel cord as defined in claim 21 comprising a single twisted bundle of wires forming a compact fixed position cord with a substantially regular multilayer wire structure.

38. A steel cord as defined in claim 37, wherein said wire structure is circular.

39. A steel core as defined in claim 37, wherein said wire structure is polygonal.

40. A steel cord as defined in claim 21, wherein the cross-section of said cord exhibits a varying degree of compactness from tightly closed to less compact.

41. A steel cord as defined in claim 21, wherein said layers comprise 27 wires twisted together into a layered construction comprising two wire layers, said core containing 4 or 5 wires so as to form a regularly packed cross-section of the type 4+8+15, 4+9+14 or 5+8+14 wherein said protective coating is a zinc coating covering the 8 or 9 wires of the subsurface cord layer.

42. A vulcanizable rubber product in the form of a tire, a strap, a belt and the like, comprising a steel cord as defined in claim 21.

43. A high-performance steel cord for use in high-duty rubber tires, in particular truck tires, comprising 27 steel filaments assembled into a compact layered (3+9+15) cord structure featuring in cross-section a 3-filaments core surrounded by two concentric rings comprising respectively 9 and 15 filaments, said filaments comprising hard drawn pearlitic carbon steel wires of 0.7 to 0.9% C, having a diameter ranging from 0.1 to 0.4 mm and a tensile strength of at least 2800 N/mm$^2$, wherein the 15 exterior wires are covered with a rubber adherent brass alloy containing from 60 to 70% of copper, and wherein the 9 wires forming a continuous ring between the core and the external brassed layer are covered with a corrosion resistant zinc coating, effective to significantly enhance cord endurance, adhesion retention and related tire life by the combined effect of suppressing unexpected local brittle wire breaks, premature cord corrosion fatigue cracking and of an increased rubber penetration.

44. A steel cord as defined in claim 43, wherein the tensile strength is at least 3000 N/mm$^2$.

* * * * *

REEXAMINATION CERTIFICATE (1220th)

United States Patent [19]
Dambre

[11] B1 4,651,513
[45] Certificate Issued Mar. 13, 1990

[54] LAYERED STEEL CORD

[75] Inventor: Paul Dambre, Kemmel, Belgium

[73] Assignee: N.V. Bekaert S.A., Zwevegem, Belgium

Reexamination Request:
No. 90/001,654, Dec. 1, 1988

Reexamination Certificate for:
Patent No.: 4,651,513
Issued: Mar. 24, 1987
Appl. No.: 779,568
Filed: Sep. 24, 1985

[30] Foreign Application Priority Data

Sep. 24, 1984 [GB] United Kingdom ............... 84-24086

[51] Int. Cl.$^4$ .................... D02G 3/48; D02G 3/12; D07B 1/06
[52] U.S. Cl. ........................ 57/217; 57/213; 57/215; 57/221; 57/902; 152/451; 152/527; 152/556
[58] Field of Search ................ 57/212–215, 57/217–219, 221, 223, 902; 152/451, 527, 556, 557

[56] References Cited

U.S. PATENT DOCUMENTS

| | | | |
|---|---|---|---|
| 2,792,868 | 5/1957 | Benson | 57/902 X |
| 3,015,205 | 1/1962 | Massot et al. | 57/217 |
| 3,240,570 | 3/1966 | Grimes, Jr. et al. | 57/217 X |
| 3,336,744 | 8/1967 | Peene | 57/902 X |
| 3,413,799 | 12/1968 | Lejeune | 57/217 |
| 3,741,507 | 6/1973 | Hahn . | |
| 3,762,145 | 10/1973 | Kikuchi et al. | 57/221 X |
| 3,834,149 | 9/1974 | Nisbet | 57/217 X |
| 3,858,635 | 1/1975 | Nakamoto et al. | 57/902 X |
| 4,158,946 | 6/1979 | Bourgois | 57/902 X |
| 4,268,573 | 5/1981 | Baillievier | 57/902 X |
| 4,332,131 | 6/1982 | Palsky et al. | 57/213 |
| 4,349,063 | 9/1982 | Kikuchi et al. | 57/215 X |
| 4,481,996 | 11/1984 | De Bondt et al. | 57/902 X |

FOREIGN PATENT DOCUMENTS

| | | |
|---|---|---|
| 854536 | 5/1977 | Belgium . |
| 2405127 | 8/1974 | Fed. Rep. of Germany . |
| 3302673 | 8/1983 | Fed. Rep. of Germany . |
| 1466114 | 3/1977 | United Kingdom . |

OTHER PUBLICATIONS

Research Disclosure, Dec. 1981, No. 21222, Havant Hampshire, GB, L. Schmitt: "Vehicle Tyre Reinforcement".

*Primary Examiner*—John Petrakes

[57] ABSTRACT

A steel cord for reinforcing rubber products such as truck tires comprises a plurality of steel wires twisted together to form a multiwire layered cable construction having two or more successive wire layers around a common core. The wires of the outer layer are covered by a rubber adherable coating of, e.g. brass, and the wires (shaded) of the layer inwardly adjacent the surface layer are covered by a corrosion resistant coating, such as zinc or a zinc alloy.

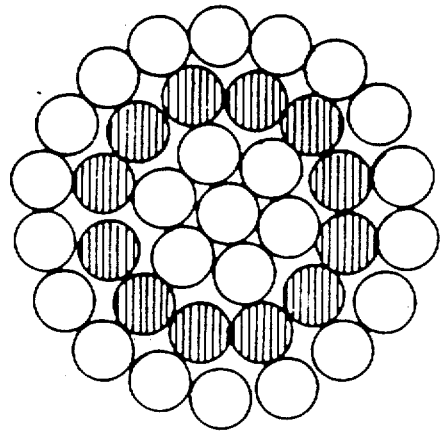

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 13-21 and 43 are cancelled.

Claims 2, 3, 5, 6, 8-10, 12, 22, 25-28, 34, 36, 37, 40-42 and 44 are determined to be patentable as amended.

Claims 4, 7, 11, 23, 24, 29-33, 35, 38 and 39, dependent on an amended claim, are determined to be patentable.

New Claims 45-47 are added and determined to be patentable.

2. A steel cord as claimed in claim [1] *45*, wherein the tensile strength of said steel wire is not less than about 2500 N/mm$^2$.

3. A steel cord as claimed in claim [1] *45*, wherein said cord is used in reinforcing a pneumatic tire, said steel wire being hard drawn pearlitic steel wire having a diameter of from about 0.1 mm to about 0.4 mm and having from about 0.6% to about 1.2% by weight carbon steel, and a tensile strength in a range of from about 2600 N/mm$^2$ to about 3000 N/mm$^2$, the wires of said outermost layer being covered by a brass coating having a thickness of from about 0.10 μm to about 0.40 μm, said brass coating having a composition of from about 58% to about 72% Cu, the remainder being substantially zinc.

5. A steel cord as claimed in claim [1] *45*, wherein said steel wire has a tensile strength of greater than about 3000 N/mm$^2$.

6. A steel cord as claimed in claim [1] *45*, wherein said cord has a cross-section of nearly circular shape comprising said wire layers twisted together in consecutive steps in either of the same or the opposite direction around said core, and wherein the twisting pitch between said wire layers is adjustable to prevent unwinding and wire migration.

8. A steel cord as claimed in claim [1] *45*, wherein said cord comprises a single twisted bundle of said steel wires, said bundle being closed in a single operation to form a compact fixed position cord with a substantially regular multilayer wire structure, said cord having a cross-section which varies from a circular to a polygonal configuration.

9. A steel cord as claimed in claim [1] *45*, wherein the cross-section of said cord exhibits a degree of compactness which is a function of wire diameter, wire shape, the number of wires in each said wire layer, closing operation, and twisting pitch.

10. A steel cord as claimed in claim [1] *45*, wherein said zinc alloy is selected from the group consisting of Zn—Ni, Zn—Fe, Zn—Mn, Zn—Al and Zn—Mg.

12. A steel cord as defined in claim [1] *45*, said cord comprises 27 wires twisted together into a layered construction consisting of two wire layers, said core containing one of either 4 or 5 wires, thereby forming a regularly packed cross-section of a type selected from 4+8+15, 4+9+14 and 5+8+14.

22. A steel cord as defined in claim [21] *46*, wherein said protective coating is a corrosion resistant metal coating comprising zinc.

25. A steel cord as defined in claim [21] *46*, wherein said tensile strength is at least 2500 N/mm$^2$.

26. A steel cord as defined in claim [21] *46*, wherein said core is a wire core containing at least one wire.

27. A steel cord as defined in claim [21] *46*, wherein said core contains at least one wire strand which may be formed of twisted wires or of substantially parallel wires assembled into a wire strand.

28. A steel cord as defined in claim [21] *46*, having a combination of elevated stengthening power and enhanced durability for use in reinforcing a pneumatic tire, said cord being assembled from 0.1 to 0.4 mm diameter hard drawn pearlitic steel wires of 0.6 to 1.2% carbon steel with a tensile strength in a range of from 2600 to 3000 N/mm$^2$, the wires of the cord surface layer being covered by a 0.10 to 0.40 μm thick brass coating of a composition containing from 58 to 72% Cu, the remainder being substantially zinc, and said protective coating covering and the wires of the layer inwardly adjacent said brassed surface layer being a corrosion resistant zinc containing coating.

34. A steel cord as defined in claim [21] *46*, having a cross-section of nearly circular shape comprising successive substantially concentric wire layers twisted together in consecutive steps, in the same direction around said core, and wherein the twisting pitch between the successive layers is adjustable to prevent unwinding and/or wire migration.

36. A steel cord as defined in claim [21] *46*, having a cross-section of nearly circular shape comprising successive substantially concentric wire layers twisted together in consecutive steps, in the opposite direction around said core, and wherein the twisting pitch between the successive layers is adjustable to prevent unwinding and/or wire migration.

37. A steel cord as defined in claim [21] *46*, comprising a single twisted bundle of wires forming a compact fixed position cord with a substantially regular multilayer wire structure.

40. A steel cord as defined in claim [21] *46*, wherein the cross-section of said cord exhibits a varying degree of compactness from tightly closed to less compact.

41. A steel cord as defined in claim [21] *46*, wherein said layers comprise 27 wires twisted together into a layered construction comprising two wire layers, said core containing 4 or 5 wires so as to form a regularly packed cross-section of the type 4+8+15, 4+9+14 or 5+8+14 wherein said protective coating is a zinc coating covering the 8 or 9 wires of the subsurface cord layer.

42. A vulcanized rubber product in the form of a tire, a strap, a belt and the like, comprising a steel cord as defined in claim [21] *46*.

44. A steel cord as defined in claim [43] *47*, wherein the tensile strength is at least 3000 N/mm$^2$.

*45. A rubber adherable multilayer steel cord, comprising:*

*a wire core;* at least two wire layers, each said layer comprising a plurality of steel wires having a tensile strength in excess of 2200 N/mm², said layers consecutively arranged about said wire core, each of said wire layers having a thickness of about one wire diameter and forming a regular geometric packing having a specific shape and compactness;

the wires of the second outermost layer being covered with a corrosion resistant metal coating selected from the group consisting of zinc and a zinc alloy containing at least about 50% by weight zinc, and the other wires being covered with a brass coating having a thickness of from about 0.05 μm to about 0.50 μm, said brass coating being rubber adherable and containing copper in an amount of more than 55% by weight.

46. A rubber adherable multilayer steel cord having an improved capacity to reinforce vulcanizable rubber products and to withstand premature corrosion fatigue, cracking and cord/rubber debonding in harsh service conditions, said cord comprising a core and a plurality of steel wires with a tensile strength in excess of about 2200 N/mm² twisted together to form a cord construction having N wire layers consecutively arranged around said core with N being an integer of not less than 2, said wire layers having each a thickness of essentially one wire diameter and forming a regular geometrical wire packing of desired shape and compactness, the wires of the (N - 1th) layer inwardly adjacent the surface (Nth) layer being covered by a protective coating, and the other wires being covered by a 0.05 to 0.50 μm thick brass coating of a rubber adherable composition containing more than 55% copper.

47. A high-performance steel cord for use in high-duty rubber tires, in particular truck tires, comprising 27 steel filaments assembled into a compact layered (3+9+15) cord structure featuring in cross-section a 3-filaments core surrounded by two concentric rings comprising respectively 9 and 15 filaments, said filaments comprising hard drawn pearlitic carbon steel wires of 0.7 to 0.9% C, having a diameter ranging from 0.1 to 0.4 mm and a tensile strength of at least 2800 N/mm², wherein the 15 exterior wires and the 3 core filaments are covered with a rubber adherent brass alloy containing from 60 to 70% of copper, wherein the 9 wires forming a continuous ring between the core and the external brassed layer are covered with a corrosion resistant zinc coating, effective to significantly enhance cord endurance, adhesion retention and related tire life by the combined effect of suppressing unexpected local brittle wire breaks, premature cord corrosion fatigue cracking and of an increased rubber pentration.

* * * * *